MEMORY CELL WITH A NON-LINEAR COLLECTOR LOAD

Filed July 11, 1968 2 Sheets-Sheet 1

INVENTOR
JEHOSHUA N. POMERANZ
BY James E. Murray
ATTORNEY

MEMORY CELL WITH A NON-LINEAR COLLECTOR LOAD

Filed July 11, 1968 2 Sheets-Sheet 2

United States Patent Office 3,537,078
Patented Oct. 27, 1970

3,537,078
MEMORY CELL WITH A NON-LINEAR COLLECTOR LOAD

Jehoshua N. Pomeranz, Monsey, N.Y., assignor to International Business Machines Corporation, Armonk, N.Y., a corporation of New York Filed July 11, 1968, Ser. No. 744,111
Int. Cl. G11c *11/36;* H03k *3/286*
U.S. Cl. 340—173 7 Claims

ABSTRACT OF THE DISCLOSURE

This specification describes a semiconductor storage cell for use in monolithic memories. The cell comprises a pair of semiconductor devices which are coupled together to form a bistable circuit. The loads for each of the semiconductor devices includes a diode in shunt with a resistive element. While the storage cell is just storing information, these diodes are biased off. However, when information is to be read out of or into the storage cell one or both of the diodes is rendered conducting. The use of the diode in shunt with a resistive load in this manner reduces the stand-by power consumed by the storage cell, prevents the saturation of the semiconductor devices, and aids in the switching of the state of the cell.

BACKGROUND OF THE INVENTION

The present invention relates to semiconductor storage cells and more particularly to semiconductor storage cells that are operated in multi-current modes so as to reduce power dissipation.

One problem with the use of semiconductor bistable circuits as storage cells in monolithic computer memories is that they dissipate energy and thereby cause heating of the monolithic chips on which they are formed. To keep these chips at an operating temperature it is therefore necessary that they be cooled. As the bit density, or the number of cells in a given area of the chips is increased, the heating problems become more critical, and very sophisticated and expensive cooling apparatus must be used in order to maintain the memory at an operating temperature level. For this reason dissipation of heat by the cells materially adds to the cost of monolithic computer memories and is also a limiting factor on the speed of operation of the memory and the size of the memory. Therefore it is desirable to reduce the dissipation of heat by the cells.

SUMMARY

As in most monolithic memory arrays, the storage cells of the present invention each have two semiconductor devices crosscoupled to form a bistable circuit. In accordance with the present invention the loads for each of the semiconductor devices includes a diode in shunt with a resistive element. While the memory is merely storing information, the diode is held nonconducting so that current necessary to maintain the storage cell in its operating state must pass through the resistive element. However when information is to be read into or read out of the storage cell one or both of the diodes conduct to increase the current passing through the conducting one of the semiconductor devices. The use of the diodes in shunt with a resistive load in the manner described reduces the stand-by power consumed by the storage cell, prevents the saturation of the semiconductor devices and aids in the switching of the state of the cell.

Therefore it is an object of the present invention to provide storage cells which can be fabricated into monolithic memories.

It is another object of this invention to provide a storage cell which dissipates very little power.

It is a further object of this invention to provide storage cells that will operate at two different power levels so as to cut down the dissipation from the storage cell.

DESCRIPTION OF THE DRAWINGS

The foregoing and other objects, features and advantages of the invention will be apparent from the following more particular description of the preferred embodiments of the invention as illustrated in the accompanying drawings, of which:

Referring to FIG. 1, transistors T1 and T2 are double emitter transistors with the base of each connected to the collector of the other and the emitter of *e2* of one connected to the emitter *e3* of the other. The connected emitters *e2* and *e3* are tied to a negative terminal 10 through a resistor R3 while the collectors of both transistors are connected to a word line WL. The collector of transistor T1 is connected to the word line WL through a resistor R1 and a diode D1 in shunt. In a like manner the collector of the transistor T2 is connected through both diode D2 and resistor R2 to the word line WL. As shall be seen later the potential on the word line WL is varied to control the state of the cell and to read information out of the cell.

The emitters *e4* and *e1* of transistors T1 and T2 go repsectively to the B1/S1 and B0/S0 bit lines for the storage cell. Like the word line WL the potential on the bit line B1/S1 and B0/S0 are controlled to vary the state of the cell. Also the bit lines are connected to a sense amplifier for the detection of the output signals from the storage cell.

Assume now that the storage cell is merely storing information and that it is storing a digital "1" as opposed to a digital "0." Then transistor T1 is conducting and transistor T2 is held nonconducting by the cross coupling of the base of transistor T2 to the collector of transistor T1. During this storage period, the potential supplied between the word line WL and the negative terminal 10 is sufficient to maintain T1 conducting but is insufficient to cause either diode D1 or D2 to conduct. Thus the current used to maintain the transistor T1 in conductance during the storage state of the cell passes through resistor R1 and R2. As can be seen, the voltage level between terminal 10 and the word line WL must be quite small, otherwise diodes D1 or D2 would conduct. This, aided by the fact that resistors R1 and R2 are quite large (in the order of 12,000 ohms), keeps $I^2R$ loss of the cell quite small during the storage period.

While the cell is not being interrogated the potentials supplied to the emitters *e4* and *e1* through the bit lines B1/S1 and B0/S0 are more positive than the potential developed at emitters *e2* and *e3* by current flowing through resistor R3. Thus with transistor T1 conducting current will travel from the word line WL through resistor R1, transistor T2 and resistor R3 to negative terminal 10.

Now assume the information stored in the cell is to be read from the cell. Then the voltage on the word line WL is raised. This rise in voltage causes diode D1 to conduct and also raises the voltage drop across resistor R3 so that the potential at the emitters *e2* and *e3* is more positive than the potential on emitters *e1* and *e4*. Thus, with diode D1 conducting, resistor R1 is shunted significantly increasing the size of the signal to the sense amplifier connected to the B1/S1 and the B0/S0 bit lines through which the current from the cell will now flow.

Therefore, though the voltage used to store the information is small and likewise the voltage used to read the information is only slightly larger, the use of the small voltages does not materially effect the read signal since either diode D1 or D2 comes into play during the read cycle so as to increase the magnitude of the available signal to the sense amplifier.

Figure 1:
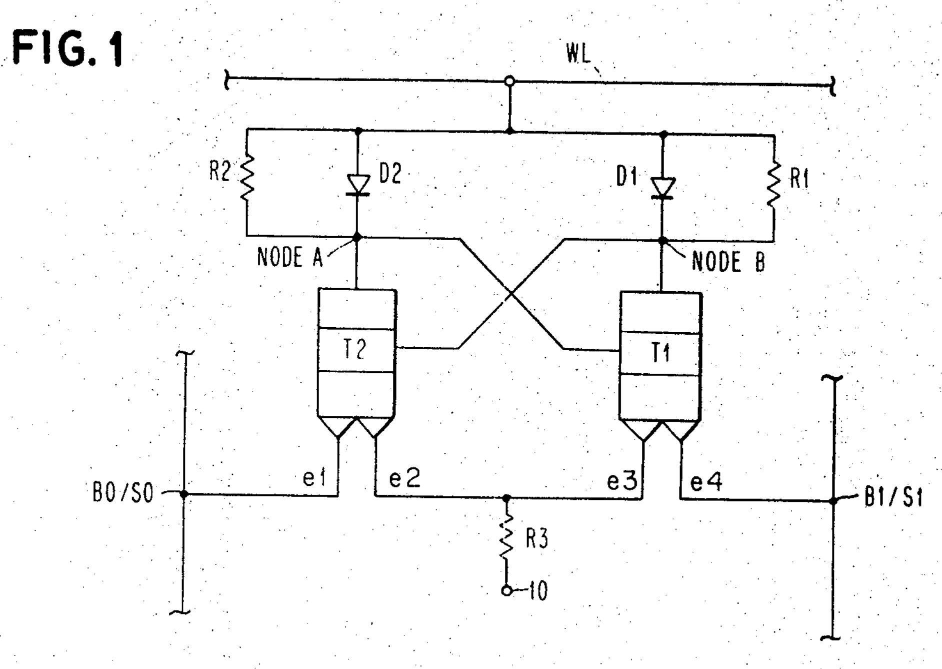
FIG. 1 is a schematic of the storage cell of the present invention.
Figure 2:
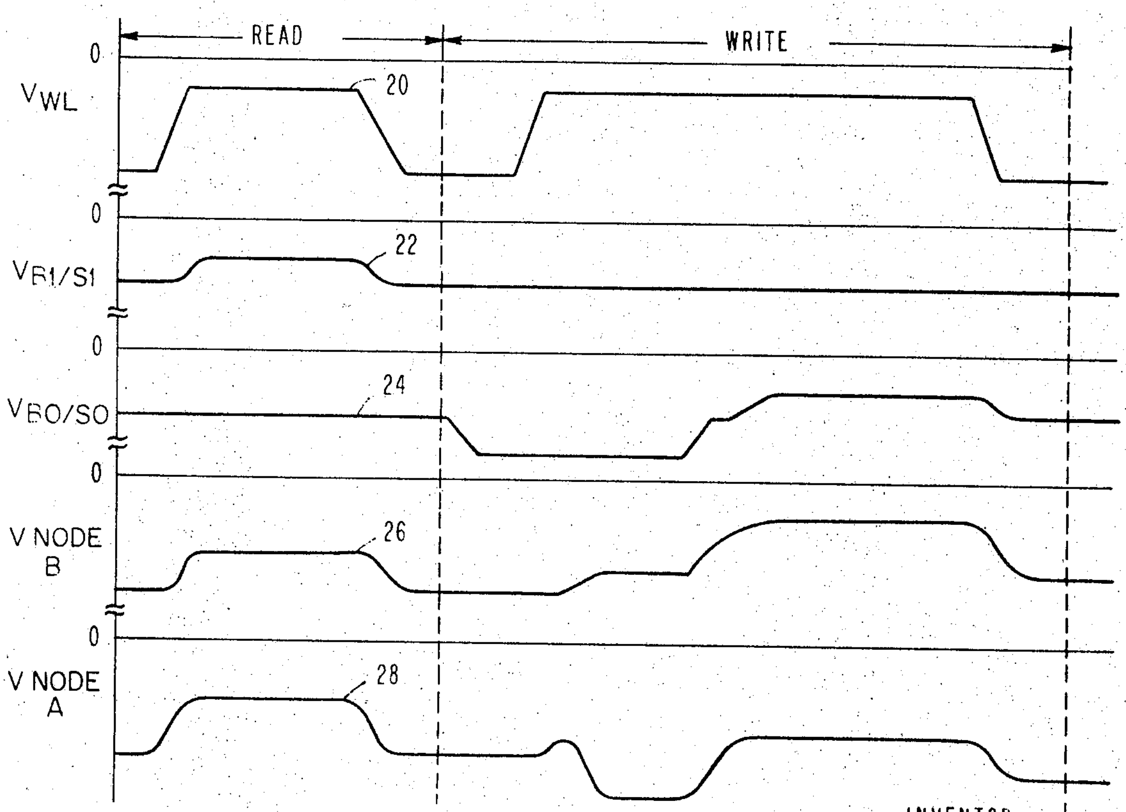
FIG. 2 shows curves produced by reading and writing the information stored in the storage cell.

Voltage curves for typical read cycles are shown in the first portion of FIG. 2. As is illustrated when the voltage 20 on the word line WL is raised, it causes the voltage 22 at the B1/S1 terminal to increase. This results from the fact that the increased current through transistor T1 increases the voltage drop across resistor R3 thus raising the potential at emitter *e*3 above that of the potential at emitter *e*4 thus causing the current to switch from the path through emitter *e*3 to the current path through emitter *e*4. Since T2 is nonconducting there is no current through the emitter *e*1 so that the potential 24 on the B0/S0 sense line is undisturbed. Therefore there is a differential signal between the B1/S1 and B0/S0 sense lines that is picked up by the sense amplifier and recognized by the sense amplifier as a stored "1." If T2 is conducting when the word line voltage is raised, the potential at the B0/S0 terminal increases while the potential at the B1/S1 terminal is undisturbed. The sense amplifier recognizes this as a stored "0."

When the voltage 20 on the word line WL increases during a read cycle, the potential 26 at the collector of transistor T1 or at node B increases with it due to the conductance of diode D1 which shorts out resistor R1 to increase the current supplied through the transistor T1 to the B1/S1 bit line. The potential 28 at the collector of transistor T2 or at node A also increases. However this increase is greater since the current through resistor R2 is initially less and is not sufficient to cause diode D2 to conduct.

Besides increasing the current flow through transistor T1 the conductance of diode D1 prevents the transistor T1 from being driven into saturation by the increase in the voltage on the word line WL. Thus when the word line WL returns to its previous potential at the end of the read pulse the transistor T1 recovers rapidly from the interrogation.

Assume you now wish to write a "0" into the storage cell, that is change the cell so that transistor T2 conducts instead of transistor T1. This is accomplished by a coincidence of signals on the word line WL and the B0/S0 bit line. The potential on the word line WL is increased while B0/S0 bit line potential is decreased. This causes both diodes D1 and D2 and transistor T2 to conduct. When diode D2 and transistor T2 conduct, node A drops turning off transistor T1 and starting a regenerative action associated with cross coupled semiconductors which results in the conductance of transistor T2 and the biasing off of transistor T1. When the switching process is complete the voltage on the word line WL and the bit line B0/S0 are returned to their normal levels.

An example of what happens to the verious potentials during a write operation is shown in the second portion of FIG. 2. As can be seen first the B0/S0 word line potential 24 is lowered. Then the word line WL voltage 20 is raised. When the word line voltage 20 is raised the potential at node B increases due to the conductance of diode D1. Likewise the potential at node A momentarily increases. However as transistor T2 turns on the potential at node A drops below its original level. When the bit line potential 24 is brought back up to its initial value while the word line potential 20 is still up both the potential at node A and node B drift upward, and since this is equivalent to a read operation, the potential at the B0/S0 output rises to give a read indication to the sense amplifier.

When the WL pulse ends the output on the B0/S0 terminal subsides with it and the potentials at node A and node B go to the potential that the other was at prior to the initiation of the write cycle so that the state of the pair is completely reversed. As can be seen the diode D2 acts as a catalyst during the write cycle, initially starting the regenerative action that finally results in the reversal of the state of the cell.

We have now described a write cycle to switch the state from storing a "1" to storing a "0." If a "1" is to be stored in the cell, again, the process would be repeated. However this time the B1/S1 terminal would be lowered instead of the B0/S0 terminal. This would cause the cell to switch in the same manner as described so as to effect a switch from the conductance of transistor T2 to the conductance of transistor T1.

Above we have described the operation of the cell. As can be seen the diodes D1 and D2 perform a number of functions. First during the read cycle they short out the load resistor of the conducting transistor so as to increase the current supplied to the bit line, thus giving a large signal output with the small voltages used in the operation of the cell. Also during read and write cycles the conductance of the diode in the load of the conducting transistor assures rapid recovery from the read cycle by varying the slope of the load line of that transistor to avoid the saturation level. During the write cycle the diodes D1 and D2 not only perform the functions mentioned above but aid in the switching process since they raise the voltages at the collector of the nonconducting transistor so as to initiate the regenerative action that results in the conductance of noconducting transistor.

Figure 3:
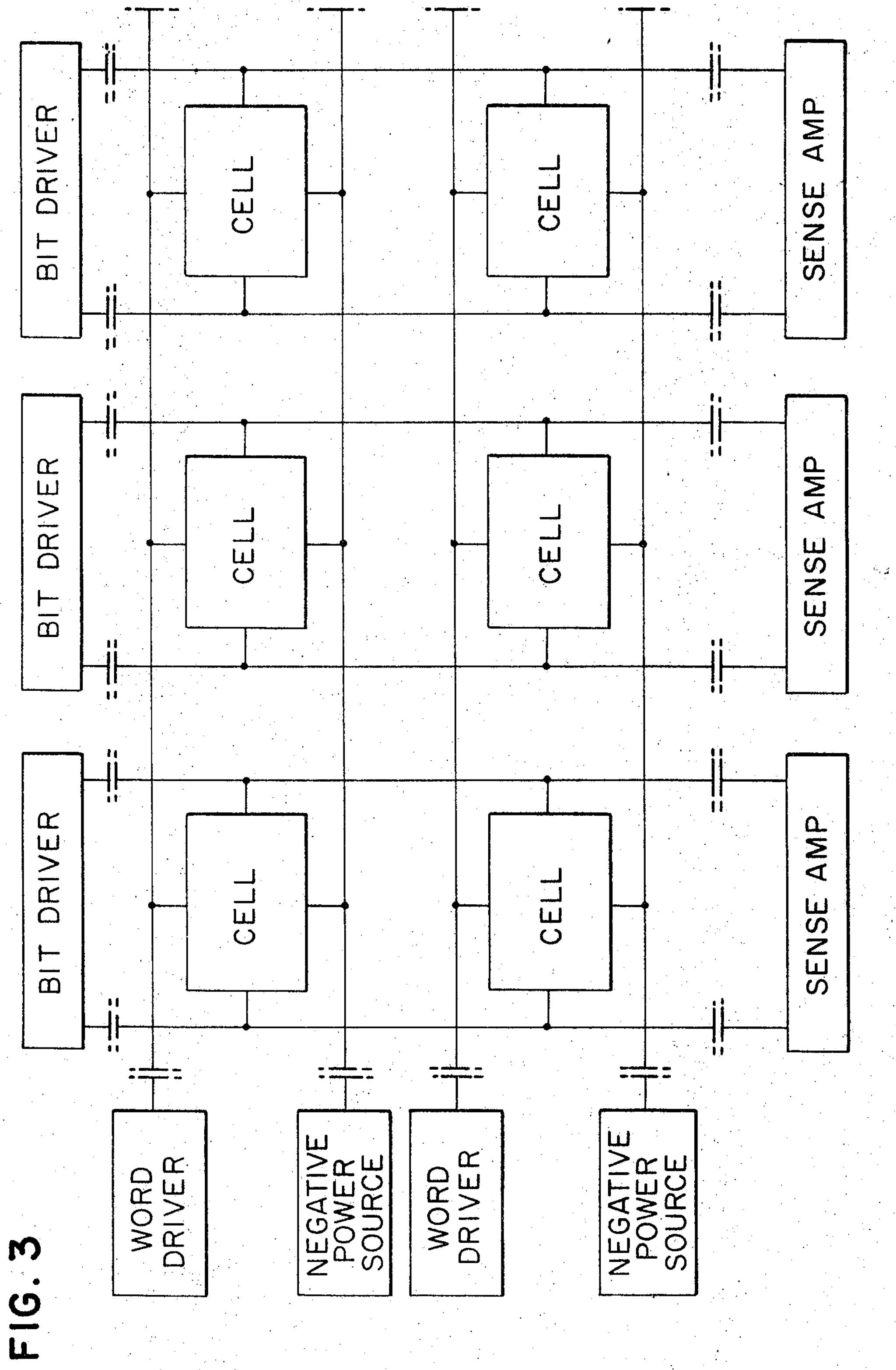
FIG. 3 is a schematic illustrating how the storage cells of the present invention may be hooked into matrices to form memories.

FIG. 3 illustrates how the storage cell of the present invention can be employed in a monolithic memory. The illustrated components other than the cells are all well known to those skilled in the art and therefore will not be discussed in this specification.

While the invention has been particularly shown and described with reference to a preferred embodiment thereof it will be understood by those skilled in the art that various changes in form and details may be made therein without departing from the spirit and scope of the invention.

What is claimed is:

1. In a storage cell having two cross-coupled double emitter transistors each with a high empedance resistive load in its collector circuit so as to form a bistable circuit with a storage state, a read cycle and a write cycle, the improvement which comprises a separate forward biased diode semiconductive shorting means for providing a low impedance path in shunt with each resistive load when said semiconductive shorting means is conductive, and bilevel source means for rendering both said shorting means nonconductive when said bistable circuit is in its storage state and only one of said semiconductive shorting means conductive when said bistable circuit is in the read cycle.

2. A storage cell comprising:

(a) two transistors with emitters of each transistor connected together and the collector of each transistor connected to the base of the other;

(b) a resistive load connected to the collected of each of the two transistors for providing high impedance collector loads for the transistors;

(c) separate forward biased diode means in shunt with each of the collector loads for providing a low impedance path around each resistive load when the diode means in shunt with the particular resistive load is rendered conductive by the potential drop across the resistive load; and (d) source means providing two levels of potential across the two transistors and their collector loads, the first level of potential being supplied to the storage cell while the storage is not being interrogated and being insufficient to forward bias the diodes into conduction and the second level of potential being supplied to the storage cell while the storage cell is being interrogated and being sufficient to bias only the diode in the collector circuit of the conductive one of the transistors conductive with the potential drop across the resistive load in parallel with it.

3. The storage cell of claim 1 wherein said source means includes means for rendering the semiconductive shorting means in shunt with the resistive load in the collector circuit of the conducting one of said double emitter transistors conductive during the read cycle while the other semiconductive shorting means remains nonconductive during the read cycle.

4. The storage cell of claim 1 wherein said semiconductor shorting means are both forward biased diodes.

5. A storage cell comprising:

(a) two transistors with emitters coupled together and the collector of each coupled to the base of the other;

(b) source means for providing two levels of potential a first level while the storage cell is not being interrogated and a second higher level while the storage cell is being interrogated for reading or writing;

(c) a resistive load in the collector circuits of each of said two transistors in series with said source means and the particular transistors so as to form a bistable circuit with two transistors in which one of the transistors is conductive while the other transistor is nonconducting; and only (d) semiconductor shorting means in shunt with each of said resistive loads for providing a low impedance path for current around the resistive load in parallel with it, both said semiconductive shorting means being biased nonconductive by the potential drop across the resistor load in parallel with it while said source is supplying the first of the two potentials and the semiconductor shorting means in series with the conducting one of said transistors being biased conductive by the potential drop across the resistive load in parallel with it while said source is supplying higher of its at least two potentials.

6. The storage cell of claim 5 wherein said transistors are multi-emitter transistors with an additional emitter on each of said transistors being individually adjusted in potential so as to provide said storage sell with three levels of potential.

7. The storage cell of claim 5 wherein said shorting means are forward biased diodes neither of which conducts at the lowest of the supplied levels, both of which conduct at the highest of the supplied level and only the diode in series with the conducting transistor conducts at the intermediate level while diode in series with the nonconducting transistor does not conduct at the intermediate level.

References Cited

UNITED STATES PATENTS

| | | | |
|---|---|---|---|
| 2,795,695 | 6/1957 | Raynsford. | |
| 3,182,210 | 5/1965 | Jebens | 307—291 X |
| 3,389,383 | 6/1968 | Burke. | |
| 3,423,737 | 1/1969 | Harper | 340—173 |
| 3,437,840 | 4/1969 | Murray | 307—291 X |

TERRELL W. FEARS, Primary Examiner

U.S. Cl. X.R.

307—238